Jan. 4, 1955
V. HAENSEL
2,698,829
TWO-STAGE PROCESS FOR THE CATALYTIC
CONVERSION OF GASOLINE
Filed Dec. 29, 1950
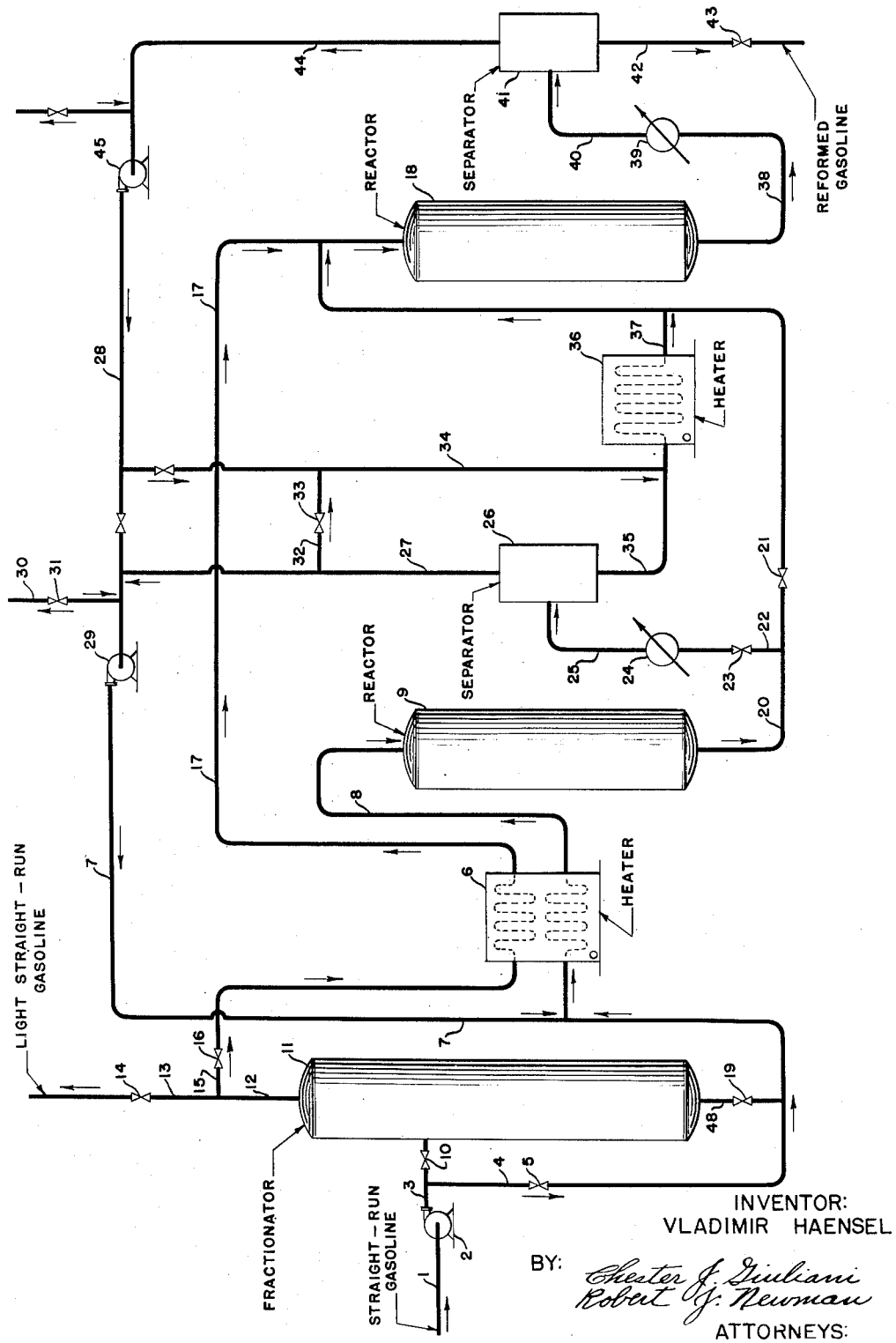
INVENTOR:
VLADIMIR HAENSEL
BY: Chester J. Giuliani
Robert J. Newman
ATTORNEYS:

2,698,829
Patented Jan. 4, 1955

2,698,829

TWO-STAGE PROCESS FOR THE CATALYTIC CONVERSION OF GASOLINE

Vladimir Haensel, Hinsdale, Ill., assignor to Universal Oil Products Company, Chicago, Ill., a corporation of Delaware Application December 29, 1950, Serial No. 203,474

2 Claims. (Cl. 196—50)

This application is a continuation-in-part of my copending application Serial No. 92,866, filed May 12, 1949, now U. S. Patent 2,664,386.

This invention relates to the catalytic conversion of hydrocarbon fractions. It is more particularly concerned with a specific method of reforming straight run gasolines and the like in the presence of catalyst comprising alumina containing minor proportions of combined halogen and a member of the platinum group.

Catalysts comprising alumina, a member of the platinum group, particularly platinum, and combined halogen, particularly combined fluorine and combined chlorine, are especially useful in the reforming of hydrocarbons. Hydrocracking of paraffins and dehydrogenation of naphthenes are among the principal reactions that are promoted by these catalysts, which are capable of increasing the octane number of straight run gasolines and naphthas to values that are substantially higher than those that ordinarily can be reached by thermal reforming. In addition, the yield-octane number relationships realized with these catalysts are much better than are the corresponding relationships obtained in thermal reforming and in most of the prior catalytic reforming processes. By an appropriate selection of operating conditions, these catalysts can be used for a number of weeks and even months without regeneration. These catalysts also are effective in promoting the isomerization of hydrocarbons, particularly paraffinic hydrocarbons. I have invented an improved process for reforming straight run gasolines and the like in the presence of these catalysts.

It is an object of the present invention to increase the octane number of low octane gasolines and fractions thereof.

It is another object of the present invention to produce higher yields of reformed gasolines having lower volatilities than normally are produced in reforming processes employing catalysts comprising platinum, alumina, and combined halogen.

In one embodiment my invention relates to an improvement in the reforming of a hydrocarbon fraction containing naphthenes and paraffins and boiling approximately within the gasoline range in the presence of hydrogen and a catalyst comprising platinum, alumina, and combined halogen, said improvement comprising subjecting said fraction to the action of a first body of said catalyst maintained at reforming conditions including a pressure of at least about 500 p. s. i. g., and thereafter subjecting the thus-treated fraction to a second body of said catalyst maintained at reforming conditions including a pressure less than about 500 p. s. i. g., the pressure on said second body of catalyst being at least about 200 p. s. i. less than the pressure on said first body of catalyst.

In another embodiment my invention relates to a process which comprises passing hydrogen and a hydrocarbon fraction containing paraffins and naphthenes and boiling approximately within the gasoline range through a first bed of platinum-alumina-combined halogen catalyst at a temperature of from about 750° F. to about 1000° F. and a pressure greater than about 500 p. s. i. g., passing the bulk of the hydrocarbons in the effluent from said first catalyst body together with hydrogen through a second body of platinum-alumina-combined halogen catalyst at a temperature of from about 750° F. to about 1000° F. and a pressure less than about 500 p. s. i. g., the pressure on said second body of catalyst being at least about 200 p. s. i. less than the pressure on said first body of catalyst.

In a further embodiment my invention relates to a process which comprises fractionating a straight run gasoline into a light fraction and a heavy fraction, passing hydrogen and the heavy fraction through a first body of catalyst comprising alumina containing 0.05–1.5% platinum and 0.1–3.0% combined halogen at a pressure greater than about 500 p. s. i. g., supplying the bulk of the hydrocarbons in the effluent from said first catalyst body together with hydrogen and said light fraction to a second body of catalyst comprising alumina containing 0.05–1.5% platinum and 0.1–3.0% combined halogen at a pressure less than about 500 p. s. i. g., the pressure on said second body of catalyst being at least about 200 p. s. i. less than the pressure on the first body of catalyst.

The hydrocarbon stocks that may be reformed in accordance with my process comprise hydrocarbon fractions containing naphthenes and paraffins. The preferred stocks are those consisting essentially of naphthenes and paraffins although in some cases aromatics and/or olefins also may be present. This preferred class includes straight run gasolines, natural gasoline, and the like. Thermally cracked gasolines frequently may be employed, alone or in admixture with a straight run gasoline or fraction thereof. The gasoline may be a full boiling range gasoline having an initial boiling point within the range of from about 50° to about 100° F. and an end boiling point within the range of from about 325° to about 425° F., or it may be a selected fraction thereof which usually will be a higher boiling fraction, commonly referred to as naphtha, and generally having an initial boiling point within the range of from about 125° to about 250° F. and an end boiling point within the range of from about 350° F. to about 425° F.

The catalyst that may be used in my process comprises alumina containing minor amounts of combined halogen and a member of the platinum group, i. e., ruthenium, rhodium, palladium, osmium, irridium, and platinum. A preferred type of catalyst comprises platinum-alumina-combined halogen catalyst of the type described in my U. S. Patent No. 2,479,109, issued August 16, 1949. These catalysts may contain substantial amounts of platinum, but, for economic as well as for product yield and quality reasons, the platinum content usually will be within the range of from about 0.05 to about 1.5%. These catalysts also contain a relatively minor amount of halogen, especially fluorine or chlorine. On a dry alumina basis the halogen content usually will be between about 0.1% and about 3.0%. The precise manner in which the halogen is present in the catalyst is not known, but it is believed to be combined with one or more of the other constituents. Consequently, it is often referred to as combined halogen.

One method of preparing catalysts useful in my process comprises adding a suitable alkaline reagent such as ammonium hydroxide or carbonate to a salt of aluminum, such as aluminum chloride, aluminum sulfate, aluminum nitrate, and the like, in an amount sufficient to form aluminum hydroxides, which upon drying, are converted to alumina. The halogen may be added to the resultant slurry in the form of an acid such as hydrogen fluoride or hydrogen chloride, or as a volatile salt such as ammonium fluoride or ammonium chloride. Platinum, or one of the other metals of the platinum group, may be added to the alumina by adding hydrogen sulfide to chloroplatinic acid solution, for example, commingling the resulting solution with the halogen-containing alumina, and thereafter heating the resultant composite to a temperature of about 800° to about 1200° F. In general, the platinum-alumina-combined halogen catalysts that are used contain about 0.1–1.5% platinum and about 0.1–3.0% combined fluorine and/or combined chlorine.

The operating conditions maintained in the first stage of my process should be such that substantial conversion of naphthenes to aromatics, hydrocracking of higher boiling paraffins to lower boiling paraffins, and isomerization of both higher and lower boiling normal and mildly branched paraffins to their more highly branched isomers are obtained. These operating conditions ordinarily will lie within the following ranges: temperature— from about 750° F. to about 1000° F.; pressure—greater than about 500 p. s. i., and usually not greater than about 1000–1200 p. s. i. g.; hydrogen-hydrocarbon molal ratio—greater than about 0.5 and usually between about 2 and 8; and weight hourly space velocity, defined as the weight of hydrocarbon charge per hour per weight of catalyst in the reaction zone—from about 0.5 to about 40, and usually between about 2 and 4.

Under the conditions of operation outlined above, low octane number straight run gasoline and the like will be substantially up-graded with very little loss of charge stock, and the operation will be essentially nonregenerative. The nonregenerative characteristic of this operation is due to the presence of an appreciable amount of hydrogen in the reaction zone and to the relatively high pressure, i. e., greater than about 500 p. s. i. g. If pressures substantially below this value were employed, the rate of deposit of carbonaceous material on the catalyst would be greatly increased and the useful life of the catalyst would be appreciably shortened, necessitating replacement or regeneration thereof. Regeneration is undesirable because of the greatly increased capital cost of the plant when regeneration facilities are provided, because of the frequent off stream periods that are necessitated, and because inadequately controlled regeneration may harm the catalyst.

Although operation at pressures of about 500 p. s. i. g. or higher is desirable from the standpoint of catalyst life, it is disadvantageous from the standpoint of conversion of naphthenes to aromatics. At higher pressures, the equilibrium of the reaction, naphthenes to aromatics, is appreciably less favorable than it is at lower pressures. Consequently, at high pressure operations, full utilization of the naphthenes is not obtained. This results in a potential loss of octane number, since the conversion of naphthenes to aromatics increases the octane number of the product. In order to obtain a given premium octane number, it is necessary to hydrocrack to a somewhat greater extent than would be necessary if all of the potential aromatics were produced. Hydrocracking is a very efficient way of increasing the yield as well as the octane number providing it is carried out to only a limited degree, since at higher hydrocracking conversions the yield falls off rapidly. The increased hydrocracking that is necessary to compensate for the less than quantitative conversion of naphthenes results in a lower yield of gasoline product having a relatively high volatility, i. e., higher than is desired by some refiners who have natural gasoline or butanes and pentanes with which to blend into the reformate.

I avoid many of the disadvantages enumerated in the foregoing paragraph, by charging at least the bulk of the hydrocarbon effluent from the first stage to a second stage which is maintained at a pressure less than about 500 p. s. i. g., the pressure in the second stage being at least 200 p. s. i. lower than the pressure in the first stage. In my second stage, the bulk of the remaining unconverted naphthenes are dehydrogenated to the corresponding aromatic hydrocarbons. Very little hydrocracking takes place in this zone. As a result, my two stage process is capable of yielding a higher octane number product with very little loss in yield, or, by adjusting the operating conditions in the first stage to give a smaller amount of hydrocracking, there can result a larger yield of the same octane number product. In other words, the increased conversion of naphthenes to aromatics reduces the amount of hydrocracking necessary to produce a reformate of a given octane number.

In general, the reforming conditions maintained in my second stage are substantially the same as those maintained in the first stage. However, one principal exception is in the pressure which, as hereinbefore stated, will be less than about 500 pounds, and will be at least about 200 pounds lower than the pressure maintained in the first stage. As hereinbefore stated, the lower pressures favor the naphthene dehydrogenation equilibrium, and reduce the tendency towards hydrocracking. Another exception is the temperature. In general, I maintain essentially the same temperature or a higher temperature in the second stage than I do in the first stage. This is for the reason that increased temperature also favors the naphthene dehydrogenation equilibrium. Because of the lower pressure, the increased temperature has less tendency to promote hydrocracking. In some types of operation, I maintain a lower hydrogen-hydrocarbon ratio in the second stage than in the first to further decrease the hydrocracking tendency.

Hydrocarbons may be reformed in accordance with my process using fluidized, fluidized-fixed bed, suspensoid, and moving bed types of processes. However, I prefer to use fixed bed operation primarily because processes of this type tend to minimize attrition losses of the relatively expensive catalyst. One fixed bed method of conducting my invention comprises preheating hydrogen and the hydrocarbon charging stock to a conversion temperature, and passing the same through a plurality of substantially adiabatic reaction zones containing a catalyst comprising alumina containing minor amounts of combined halogen and a member of the platinum group. In the initial stages the reaction is endothermic, hence the reactant stream passing between said zones is reheated to the desired temperature. The effluent from my first, or high pressure, stage may be passed directly to my second, or low pressure, stage. Alternatively, the effluent from my first stage may be cooled to condense the normally liquid hydrocarbons, the hydrogen separated therefrom and recycled to the first zone, and the condensed hydrocarbons passed to the second zone together with hydrogen.

Another type of fixed bed process that is suitable for certain types of operations comprises passing the hydrocarbon charging stock together with hydrogen through tubes containing catalyst, said tubes being subjected to radiant heat from a radiant flame and the resulting hot products of combustion. Ordinarily, this type of operation would be suitable for my first stage which is more highly endothermic than the second stage. In any event, the reformate is recovered and the hydrogen is separated therefrom and recycled to the stages.

Further features and advantages of my process will become apparent from the description of the flow diagram shown in the figure. In the figure, a full boiling straight run gasoline is passed through line 1, is picked up by pump 2 and is discharged into line 3. If it is desired to charge the entire full boiling gasoline to the first stage of my reforming process, the gasoline is passed through line 4 containing valve 5 and into heater 6 wherein the temperature is raised to a value within the range of from about 750° F. to about 1000° F. Just before the stream enters heater 6 it is joined by a stream of recycle hydrogen, prepared as hereinafter described, which enters line 4 through line 7. The hydrogen is recycled at a rate such that the molal ratio of hydrogen to hydrocarbon is 6. The heated mixture of hydrocarbons and hydrogen leaving heater 6 pass through line 8 and into reactor 9.

If it is desired to process only the heavier portion of the straight run gasoline in reactor 9, the full boiling straight run gasoline passing through line 3 is passed through valve 10 and into fractionator 11. The light fraction, which may have an end boiling point of about 200° F., is removed overhead from fractionator 11 through line 12. If this light fraction is not to be further processed, it may be passed through line 13 containing valve 14 and sent to storage or blended with the reformed heavy fraction. If it is desired to process this light straight run fraction, it will be directed through line 15 containing valve 16 and passed into heater 6 wherein it will be heated to a reaction temperature within the range of from about 750° F. to about 1000° F. The heated light fraction will be passed through line 17 and into reactor 18. It may be necessary to increase the pressure on this light fraction if the pressure in reactor 18 is higher than it is in fractionator 11.

For purposes of simplicity, reflux condensers, receivers, pumps, and the like are omitted from the drawing although it is to be understood that they are to be employed in conjunction with fractionator 11 if necessary.

A heavy fraction having a boiling range of from about 200° F. to about 400° F. is removed from fractionator 11 through line 48 containing valve 19 and is directed through line 4, heater 6, and line 8 into reactor 9. This heavy fraction is joined by a stream of recycle hydrogen passing through line 7.

A single adiabatic reactor is shown for reactor 9, although ordinarily 2, 3 or 4 adiabatic reactors with heaters between the reactors will be employed. Reactor 9 contains a bed of ⅛" x ⅛" pellets of platinum-alumina-combined halogen catalyst having a platinum content of 0.3% and a fluorine content of 0.3%. The pressure in the reactor is maintained at 700 p. s. i. g.

The following reactions take place in reactor 9: A substantial portion of the cyclohexanes are dehydrogenated to the corresponding aromatic hydrocarbons; alkylcyclopentanes are isomerized to cyclohexanes which are then dehydrogenated to the corresponding aromatic hydrocarbons; high boiling paraffins are hydrocracked to lower boiling paraffins of higher octane number; and straight chain and mildly branched paraffins are isomerized to more highly branched paraffins. Because of the relatively high pressure that is maintained in reactor 9 to prevent excessive carbon deposition on the catalyst and thereby insure nonregenerative operation, a number of the reactions, particularly the conversion of naphthenes to aromatics, do not go to completion. Therefore, the effluent from reactor 9 contains hydrocarbons that can be converted to higher octane number hydrocarbons by processing over the same type of catalyst, but at a lower pressure.

The effluent from reactor 9 may be passed, without appreciable change in the temperature thereof, through line 20 containing valve 21 and introduced into reactor 18. Alternatively, the effluent from reactor 9 may be passed through line 20 and then directed through line 22, containing valve 23, through condenser 24, and line 25 into separator 26, wherein a separation is effected between the hydrogen, which is in the gaseous phase, and the liquid hydrocarbons. The hydrogen may then be withdrawn through line 27 and introduced into line 28, where it is picked up by compressor 29 and recycled via line 7 through heater 6 and into reactor 9. Make-up hydrogen may be added through line 30 containing valve 31, or excess hydrogen may be withdrawn through said line. Also, excess hydrogen may be bled from line 27 through line 32 containing valve 33 into line 34, which is part of a separate hydrogen recycle system for the low pressure stage.

Liquid hydrocarbons may be withdrawn from separator 26 through line 35, passed through heater 36 wherein they are heated to a reaction temperature within the range of from about 750° F. to about 1000° F. and thence passed through line 37, line 20, and into reactor 18. The liquid hydrocarbons withdrawn from separator 26 are joined by a stream of recycle hydrogen, prepared as hereinafter described, passing through line 34, before they are passed through heater 36.

Reactor 18 contains one or more beds of platinum-alumina-combined halogen catalyst having a platinum content of 0.3% and a fluorine content of 0.3%. The pressure in this reactor is maintained at 300 p. s. i. g. An appreciable proportion of the remaining alkylcyclopentanes and cyclohexanes are converted to the corresponding aromatic hydrocarbons in this reactor. If it is desired, heated light straight run fraction passing through line 17 also may be charged to reactor 18. Many of the paraffins in this light fraction will be isomerized to higher boiling isomers, and the methylcyclopentane and cyclohexane present in this fraction will be converted in large part to benzene.

The hydrogen and hydrocarbon effluent from reactor 18 is passed through line 38, condenser 39, line 40 and into separator 41. Liquid hydrocarbons are withdrawn from separator 41 through lines 42 containing valve 43 and are sent to storage or blending facilities. Hydrogen is withdrawn from separator 41 through line 44, is picked up by compressor 45, and is discharged into line 28 from whence it is recycled to reactor 9 and/or reactor 18.

The following example is given to further illustrate my invention, but it is not given for the purpose of unduly limiting the generally broad scope of the same.

EXAMPLE

A full boiling straight run gasoline having an F-1 clear octane number of 42 was passed through a bed of platinum-alumina-combined halogen catalyst comprising alumina containing 0.3% platinum and 0.3% combined fluorine. This step was designated as stage 1. The effluent from stage 1 was condensed, the hydrogen was separated from the liquified hydrocarbons, and the yield, octane number, and vapor pressure of the reformate determined. Thereafter, the effluent from stage 1 was passed directly into stage 2 with only a slight heating thereof. The catalyst in stage 2 was of the same composition as that employed in stage 1. The operating conditions and results of the two stages are shown in the following table:

Table 1

| Stage | 1 | 2 |
|---|---|---|
| Pressure, p. s. i. g. | 700 | 300 |
| Liquid Hourly Space Velocity | 3 | 4 |
| Hydrogen/Hcbn Molal Ratio | 6 | 6 |
| Av. Catalyst Temperature, ° F | 890 | 908 |
| Reformate: | | |
| Yield, Vol. Percent of Charge to Stage 1 | 92.7 | 92.2 |
| F-1+3 cc. TEL Oct. No | 93.2 | 95.9 |
| Reid Vapor Pressure, Lbs | 10.4 | 10.7 |

It can be seen that there was a very appreciable gain in the octane number of the product and only a very small loss in yield brought about by passing the effluent from stage 1 through stage 2.

The beneficial results of my two stage process are further evidenced by the following data which show the effect of pressure on the conversion of methylcyclopentane and cyclohexane to benzene at normal reforming conditions:

| Pressure, p. s. i. g. Percent Benzene | 700 | 150 |
|---|---|---|
| From Methylcyclopentane | 10 | 90 |
| From Cyclohexane | 50 | 100 |

It can be seen that if the fraction containing methylcyclopentane and cyclohexane is processed at 700 p. s. i. g., the major portion will remain unconverted. These can be converted by further processing at 150 p. s. i. g. Alternatively, this fraction need only be charged to the second stage of my process.

The principal operating conditions and reactions for my two stages are listed below:

| | 1st Stage | 2nd Stage |
|---|---|---|
| Pressure | Above about 500 p. s. i. g. | Below about 500 p. s. i. g., and at least about 200 p. s. i. g. lower than the pressure in the 1st stage. |
| Temperature | 750°–1,000° F | 750°–1,000° F., but at least as high as the temperature in the 1st stage. |
| H$_2$/Hcbn. Ratio | Fairly high to prevent carbon formation. | Need not be as high as in 1st stage. |
| Principal Reactions | Hydrocracking of paraffins, dehydrogenation of naphthenes,[1] isomerization of paraffins. | Dehydrogenation of naphthenes,[1] isomerization of paraffins. |
| Charge Stock Boiling Range. | Full boiling or heavy fraction. | Reformed full boiling range from 1st stage, or reformed heavy fraction with or without unprocessed light fraction. |

[1] Includes isomerization of alkylcyclopentanes to corresponding cyclohexanes followed by dehydrogenation.

As hereinbefore stated a relatively high pressure is necessary in the first stage to prevent carbon formation. However, this adversely affects the naphthene dehydrogenation equilibrium, hence I pass the effluent from the first stage to a second stage maintained at a lower pressure and, preferably, at a higher temperature in order to obtain dehydrogenation of the residual naphthenes. In addition, I may charge a light fraction to the second stage and thereby get increased dehydrogenation and isomerization. The result of my two-stage operation, as compared to a single stage operation is an increased yield of reformate of a given octane number, or the same yield of a higher octane number product. Also, if desired, a somewhat higher yield of a somewhat higher octane number product may be obtained. A further additional advantage, particularly for refiners who have excess quantities of light hydrocarbons available, is that I am permitted by my two stage operation to produce a gasoline of lower volatility and yet meet octane number specifications. This is due to the increased aromatic concentration in the gasoline which results in less need for hydrocracking to obtain a given octane number. The decrease in hydrocracking results in a gasoline product of decreased volatility. I may maintain one hydrogen recycle system, or, if economic or other operating or processing conditions dictate, I may maintain two separate recycle systems, one for the high pressure stage and one for the low pressure stage.

I claim as my invention:

1. A process which comprises fractionating a straight run gasoline to separate therefrom a light fraction boiling below about 200° F. and a heavy fraction boiling above about 200° F., passing hydrogen and the heavy fraction through a first body of catalyst comprising alumina containing 0.15–1.5% platinum and 0.1–3.0% combined halogen maintained at paraffin hydrocracking condition including a temperature of from about 750° F. to about 1000° F. and a pressure greater than about 500 p. s. i. g., supplying substantially all of the normally liquid hydrocarbons in the effluent from said first catalyst body together with hydrogen and said light fraction to a second body of catalyst comprising alumina containing 0.05–1.5% platinum and 0.1–3.0% combined halogen maintained at a temperature of from about 750° F. to about 1000° F. and a pressure less than about 500 p. s. i. g., the pressure on said second body of catalyst being at least about 200 p. s. i. less than the pressure on said first body of catalyst.

2. The process of claim 1 further characterized in that said light fraction contains the major portion of the methylcyclopentane and cyclohexane originally present in said straight run gasoline.

References Cited in the file of this patent

UNITED STATES PATENTS

| | | |
|---|---|---|
| 2,392,749 | Lewis et al. | Jan. 8, 1946 |
| 2,417,308 | Lee | Mar. 11, 1947 |
| 2,463,741 | Byrns | Mar. 8, 1949 |
| 2,479,110 | Haensel | Aug. 16, 1949 |